March 6, 1956    A. VAN DUYN    2,737,382
COMBINATION WEIGHING AND PRICE COMPUTING MACHINE
Filed Sept. 21, 1950
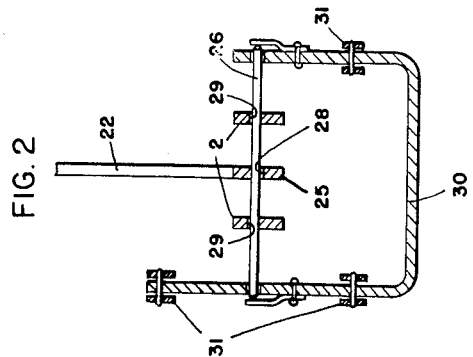
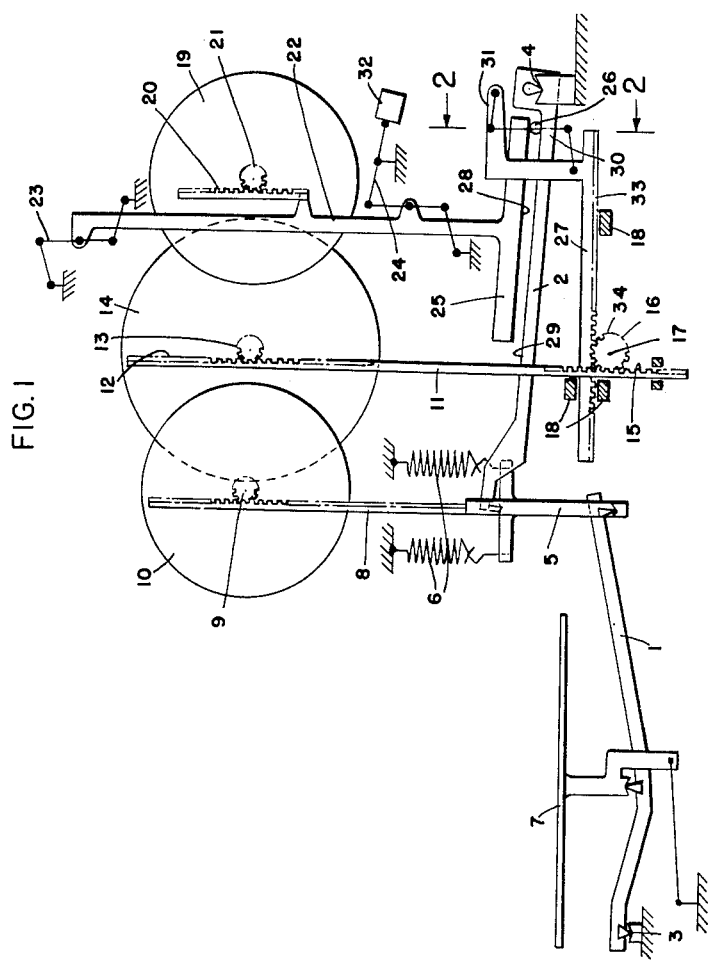
INVENTOR:
ADRIANUS van DUYN
BY
Spencer, Johnston, Cook & Root
ATT'YS United States Patent Office 2,737,382
Patented Mar. 6, 1956

2,737,382

COMBINATION WEIGHING AND PRICE COMPUTING MACHINE

Adrianus van Duyn, Hillegersberg, Rotterdam, Netherlands, assignor to U. S. Slicing Machine Company, Inc., La Porte, Ind., a corporation of Indiana Application September 21, 1950, Serial No. 185,971

Claims priority, application Great Britain January 28, 1950

3 Claims. (Cl. 265—39)

This invention relates to a combined weighing and price-computing machine and more particularly to an adjustable computed-price indicating means in a weighing machine.

It is an object of the invention to provide improved means for effecting pre-adjustment of the price-computing mechanism in accordance with the basic price of the goods to be weighed.

According to the invention there is provided a combined weighing and price-computing machine comprising lever means pivotally movable to effect counterbalancing of the applied load, computed-price indicating means operable by the lever means, and an abutment including roller means for transmitting movement of the lever means to said indicating means, the abutment is adjustable relatively to both said computed-price indicating means and the lever means towards and from the pivotal axis of the lever means. Adjustment of the abutment is made in accordance with variations on a basic price indicator whereby to cause corresponding variations in the movement of the computed-price indicating means.

Further according to the invention there is provided a combined weighing and price-computing machine comprising lever means pivotally movable to counterbalance the applied load, weight indicating means operable by the lever means, computed-price indicating means operable by the lever means, and an abutment for transmitting movement of the lever means to the computed-price indicating means, the abutment is adjustable relatively to both the computed-price indicating means and the lever means towards and from a pivotal axis of the lever means to cause variations in the movement of the computed-price indicating means. An adjustable basic-price indicator is also provided and an adjustment means operatively interconnecting the abutment and the basic-price indicator so that adjustment of the basic-price indicator effects corresponding adjustment of the abutment.

These features and other features and objects of the invention will be more fully understood by reading the following description with reference to the accompanying drawing in which:

Fig. 1 is a diagrammatic side view of one embodiment of a combined weighing and price-computing machine according to the invention; and Fig. 2 is an enlarged sectional detail view of another embodiment of the invention as seen from the position of the line 2—2 of Fig. 1.

The apparatus described herein for purposes of illustration comprises two weigh beams 1 and 2 fulcrumed respectively at 3 and 4. At their free ends the beams 1 and 2 pivotally engage at vertically spaced points a vertical link 5 supported by springs 6 which act to counterbalance a load placed on a platter 7 carried by the beam 1. The link 5 has thereon a rack 8 which meshes with a pinion 9 to actuate a rotary weight-indicating chart 10.

The vertically reciprocable arm 11 has an upper rack 12 meshing with a pinion 13 to actuate a rotary basic-price indicating chart 14, the lower rack 15 meshes with a pinion 16 which is fixed on a manually rotatable shaft 17 mounted on the supports 18—18.

The rotary computed-price chart 19 is actuated by a rack 20 which meshes with the pinion 21 on the chart 19. The vertical actuating member 22 carries the rack 20 and is pivotally connected at its ends to guide links 23 and 24 which restrict the member to vertical reciprocating movement. A T-head 25 on the member 22 is positioned between two branches of the beam 2 (Fig. 2) and rests on an abutment roller 26 which is mounted on a carrier 27 reciprocable on the support 18.

The roller 26 rests on the beam 2 (Fig. 1) and the actuating member 22 rests on the roller 26, pressure on the roller 26 by the member 22 being reduced by providing a counterweight 32 on the links 24, to support the member 22. The roller 26 is journalled at its ends in the limbs of a U-member 30 (Fig. 2) which is connected to the carrier 27 by the guide links 31, thereby permitting vertical reciprocation of the roller 26 attached to the carrier 27 and enabling pivotal movement of the beam 2 relatively to the carrier 27.

The carrier 27 has thereon a rack 33 meshing with a pinion 34 fixed to the shaft 17. By turning a handle affixed to the shaft 17, the chart 14 is adjusted to indicate the basic price of the goods to be weighed, and simultaneously the carrier 27 is reciprocated to effect a corresponding adjustment of the roller 26 along the guides 28, 29, so that the movement of the computed-price chart 19 on application of the goods to the machine, corresponds to the basic price of the goods.

In another embodiment of the invention the roller means 26 and its associated members are illustrated in the enlarged cross sectional view shown in Fig. 2. In this view the roller 26 engages a guide 28 in the head 25 (Fig. 2), and aligned guides 29—29 in the branches of beam 2, and is journalled at its ends in the limbs of a U-member 30 which is connected to the carrier 27 by guide links 31 permitting vertical reciprocation of the roller 26 attached to the carrier 27 and so enabling pivotal movement of the beam 2 relatively to the carrier 27.

The invention is hereby claimed as follows:

1. A combined weighing and price-computing machine comprising a weigh beam fulcrumed at one end thereof, a spring supported link upon which the other end of the beam is fulcrumed, a second beam fulcrumed at one end thereof, the other end of the second beam being fulcrumed to the link, a weighing platform fulcrumed on the first beam, a rack carried by the link, a pinion meshing with the rack, a rotary weight indicator operated by said pinion, a vertical actuating member, a roller abutment member resting on the second beam and supporting the vertical actuating member, a reciprocal carrier upon which the roller abutment is mounted, a stationary support carrying the reciprocal carrier, a reciprocal arm driven by the carrier, a basic price indicator driven by the reciprocal arm, a rack on the vertical actuating member, and a rotary computed price chart operated by said latter rack.

2. A combined weighing and price-computing machine comprising a weigh beam fulcrumed at one end thereof, a spring supported link upon which the other end of the beam is fulcrumed, a second beam fulcrumed at one end thereof, the other end of the second beam being fulcrumed to the link, a weighing platform fulcrumed on the first beam, a rack carried by the link, a pinion meshing with the rack, a rotary weight indicator operated by said pinion, a vertical actuating member, a roller abutment member resting on the second beam and supporting the vertical actuating member, a reciprocal carrier upon which the roller abutment is mounted, a stationary support carrying the reciprocal carrier, a reciprocal arm driven by the carrier, a basic price indicator driven by the reciprocal arm, a rack on the vertical actuating member, a rotary computed price chart operated by said latter rack, guide links connected to the ends of the vertical actuating member, and a counterweight on one of said guide links.

3. A combined weighing and price-computing machine comprising a weigh beam fulcrumed at one end thereof, a spring supported link upon which the other end of the beam is fulcrumed, a second beam fulcrumed at one end thereof, the other end of the second beam being fulcrumed to the link, a weighing platform fulcrumed on the first beam, a rack carried by the link, a pinion meshing with the rack, a rotary weight indicator operated by said pinion, a vertical actuating member, a roller abutment member resting on the second beam and supporting the vertical actuating member, a reciprocal carrier upon which the roller abutment is mounted, a stationary support carrying the reciprocal carrier, a reciprocal arm driven by the carrier, a basic price indicator driven by the reciprocal arm, a rack on the vertical actuating member, a rotary computed price chart operated by said latter rack, guide links connected to the ends of the vertical actuating member, a counterweight on one of said guide links, and interconnected means permitting operation of all of said charts and indicators by said beams when a weight is applied to said weighing platform.

References Cited in the file of this patent

UNITED STATES PATENTS

| | | |
|---|---|---|
| 531,229 | Stover | Dec. 18, 1894 |
| 542,523 | Holden et al. | July 9, 1895 |
| 1,031,699 | Emanuel | July 9, 1912 |
| 1,870,379 | Peruzziwi | Aug. 9, 1932 |
| 2,193,660 | Williams | Mar. 12, 1940 |
| 2,229,150 | Wertheimer | Jan. 21, 1941 |
| 2,445,022 | Colman | July 13, 1948 |
| 2,538,256 | Malcher | Jan. 16, 1951 |

FOREIGN PATENTS

| | | |
|---|---|---|
| 240,077 | Great Britain | Sept. 24, 1925 |